(12) United States Patent
Plascencia-Vega et al.

(10) Patent No.: US 12,223,835 B1
(45) Date of Patent: Feb. 11, 2025

(54) COORDINATED VEHICLE COLLISION AVOIDANCE SYSTEM

(71) Applicant: GM Cruise Holdings LLC, San Francisco, CA (US)

(72) Inventors: Diego Plascencia-Vega, San Francisco, CA (US); Dogan Gidon, Berkeley, CA (US); Nestor Grace, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 489 days.

(21) Appl. No.: 17/707,416

(22) Filed: Mar. 29, 2022

(51) Int. Cl.
| | |
|---|---|
| *G08G 1/16* | (2006.01) |
| *B60Q 1/50* | (2006.01) |
| *B60Q 5/00* | (2006.01) |
| *B60Q 9/00* | (2006.01) |
| *B60W 10/18* | (2012.01) |
| *B60W 10/20* | (2006.01) |
| *B60W 30/095* | (2012.01) |
| *B60W 60/00* | (2020.01) |

(52) U.S. Cl.
CPC ............. *G08G 1/161* (2013.01); *B60Q 1/525* (2013.01); *B60Q 5/006* (2013.01); *B60Q 9/007* (2013.01); *B60W 10/18* (2013.01); *B60W 10/20* (2013.01); *B60W 30/0956* (2013.01); *B60W 60/0015* (2020.02); *B60W 2556/65* (2020.02)

(58) Field of Classification Search
CPC ........ G08G 1/161; B60Q 1/525; B60Q 5/006; B60Q 9/007; B60W 10/18; B60W 10/20; B60W 30/0956; B60W 60/0015; B60W 2556/65
See application file for complete search history.

(56) References Cited

U.S. PATENT DOCUMENTS

| | | |
|---|---|---|
| 10,769,954 B1 | 9/2020 | Fields et al. |
| 2020/0042013 A1* | 2/2020 | Kelkar ................. G05D 1/0088 |

\* cited by examiner

*Primary Examiner* — Shon G Foley
(74) *Attorney, Agent, or Firm* — Wade C. Yamazaki

(57) ABSTRACT

A method includes using sensory data produced by at least one onboard sensor of a witness vehicle to predict an imminent collision in an environment of the witness vehicle, the predicted imminent collision involving at least one participant vehicle; and alerting the least one participant vehicle to the predicted imminent collision, wherein the alerting is performed by the witness vehicle and prompts the at least one participant vehicle to perform at least one action to mitigate the predicted imminent collision.

17 Claims, 6 Drawing Sheets

COORDINATED VEHICLE COLLISION AVOIDANCE SYSTEM

TECHNICAL FIELD OF THE DISCLOSURE

The present disclosure relates generally to autonomous vehicles and, more specifically, to devices and methods for a coordinated vehicle collision avoidance system implemented using autonomous vehicles.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

DESCRIPTION OF EXAMPLE EMBODIMENTS OF THE DISCLOSURE

Overview

Figure 1:
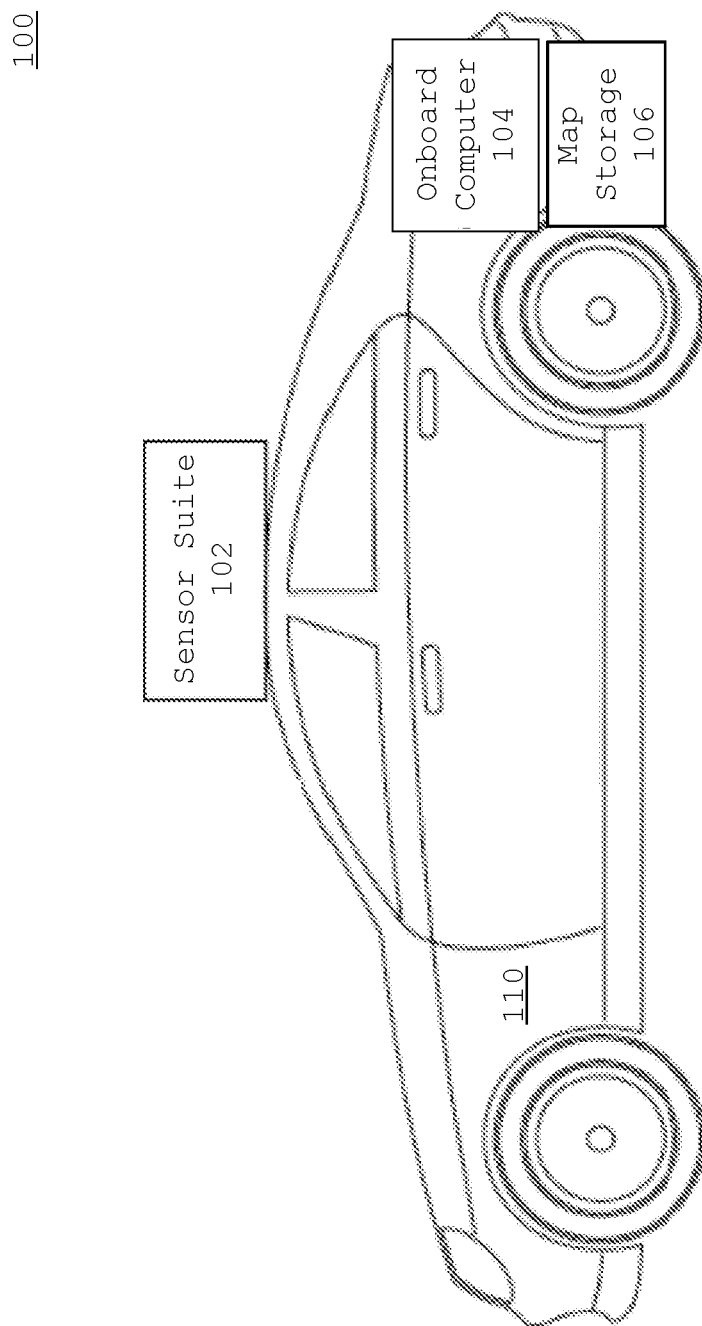
FIG. 1 is a diagram illustrating an example autonomous vehicle according to some embodiments of the present disclosure.

The systems, methods, and devices of this disclosure each have several innovative aspects, no single one of which is solely responsible for all of the desirable attributes disclosed herein. Details of one or more implementations of the subject matter described in this Specification are set forth in the description below and the accompanying drawings.

Given the numerous advantages of ride hail, rideshare, and delivery services (which services may be collectively referred to herein simply as "ride hail services") provided by autonomous vehicles, it is anticipated that autonomous vehicle ride hail services will soon become the ubiquitous choice for various user transportation needs, including but not limited to school commutes, airport transfers, and long distance road trips, to name a few.

It has become common for autonomous driving systems (ADSes) (e.g., in autonomous vehicles) and driver assistance systems (DASes) (e.g., in vehicles driven by humans) to implement some form of collision avoidance capability. Such systems typically rely on data from onboard sensors installed on the vehicle itself to implement collision avoidance. In more complicated scenarios, reliance solely on onboard sensors may not provide sufficient data to accurately detect and/or predict and subsequently prevent an impending collision involving the vehicle.

In accordance with features of embodiments described herein, in a system for implementing a Coordinated Vehicle Collision Avoidance System (CVCAS), sensory data and other information from one or more first CVCAS-enabled vehicles in a network of vehicles may be used to detect and/or predict an imminent collision involving one or more second vehicles, which second vehicles may be alerted and/or warned of the imminent collision via a Collision Imminent Prevention Broadcast Protocol (CIPBP) alert. As used herein, an "imminent collision" is a collision that, absent intervening events or actions, will occur within a brief period of time.

In certain embodiments, sensory data from a first vehicle (which may also be referred to as the "witness vehicle" or the "observer vehicle") capable of implementing CVCAS (i.e., CVCAS-enabled) may be used to detect and/or predict that a collision involving a second vehicle (which may also be referred to as the "participant vehicle") is imminent. In accordance with features of embodiments described herein, in response to detection and/or prediction that a collision involving the participant vehicle is imminent, the CIPBP may be used to alert the participant vehicle to take an action that would prevent the collision from occurring. In some embodiments, one or both of the witness vehicle and the participant vehicle are CVCAS-enabled vehicles, while in other embodiments, only the witness vehicle is CVCAS-enabled. One or both of the witness vehicle and the participant vehicle may be autonomous vehicles and/or human driven vehicles. Additionally, one or both of the witness vehicle and the participant vehicle may have installed thereon at least one of an ADS and a DAS.

In some embodiments, the CIPBP alert (or simply, "alert") issued to the participant vehicle may be an audible signal, such as honking the horn of the witness vehicle, and/or a visible signal, such as flashing the headlights of the witness vehicle. In some embodiments, the alert issued to the participant vehicle may be a control signal to an ADS or DAS system of the participant vehicle to cause the participant vehicle to take a particular action (e.g., apply the brakes or turn left or right). In some embodiments, the alert issued to the participant vehicle may be a text message displayed on the dashboard of the participant vehicle and/or an audio message played over the speakers in the cabin of the participant vehicle. In any of the foregoing embodiments, the purpose of the alert issued is to prevent the imminent collision from occurring. The alert may be issued by the witness vehicle or by a remote system based on sensory data from the witness vehicle.

As will be appreciated by one skilled in the art, aspects of the present disclosure, in particular aspects of embodiments described herein, may be embodied in various manners (e.g., as a method, a system, an autonomous vehicle, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings, in which like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting.

In the drawings, a particular number and arrangement of structures and components are presented for illustrative purposes and any desired number or arrangement of such structures and components may be present in various embodiments. Further, the structures shown in the figures may take any suitable form or shape according to material properties, fabrication processes, and operating conditions. For convenience, if a collection of drawings designated with different letters are present (e.g., FIGS. 10A-10C), such a collection may be referred to herein without the letters (e.g., as "FIG. 10"). Similarly, if a collection of reference numerals designated with different letters are present (e.g., 110a-110e), such a collection may be referred to herein without the letters (e.g., as "110").

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or 1 other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y. The terms "substantially," "close," "approximately," "near," and "about," generally refer to being within +/−20% of a target value (e.g., within +/−5 or 10% of a target value) based on the context of a particular value as described herein or as known in the art.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

Example Autonomous Vehicle

FIG. 1 is a diagram 100 illustrating an autonomous vehicle 110, according to some embodiments of the disclosure. The autonomous vehicle 110 includes a sensor suite 102 and an onboard computer 104. In various implementations, the autonomous vehicle 110 uses sensory data from the sensor suite 102 to determine its location, to navigate traffic, to sense and avoid obstacles, and to sense its surroundings. According to various implementations, the autonomous vehicle 110 may be part of a fleet of vehicles for picking up passengers and/or packages and driving to selected destinations. The autonomous vehicle 110 may be configured for ride management by an event host.

The sensor suite 102 includes localization and driving sensors. For example, the sensor suite may include one or more of photodetectors, cameras, radio detection and ranging (RADAR), SONAR, light ranging and detection (LIDAR), GPS, inertial measurement units (IMUs), accelerometers, microphones, strain gauges, pressure monitors, barometers, thermometers, altimeters, wheel speed sensors, and a CV system. The sensor suite 102 continuously monitors the autonomous vehicle's environment and, in some examples, sensor suite 102 data is used to detect selected events. In particular, data from the sensor suite can be used to update a map with information used to develop layers with waypoints identifying selected events, the locations of the encountered events, and the frequency with which the events are encountered at the identified location. In this way, sensor suite 102 data from many autonomous vehicles can continually provide feedback to the mapping system and the high-fidelity map can be updated as more and more information is gathered.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. Based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

The autonomous vehicle 110 is preferably a fully autonomous automobile but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, an airplane, a bike, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, horn honking, etc.

The autonomous vehicle 110 may include a map storage 106 for storing map data. The autonomous vehicle 110 may use the map data in various driving decisions, e.g., in finding optimal routes, in support of detecting objects along a route such as traffic lights, or for predicting behavior of other road users and planning autonomous vehicle behavior.

Example Autonomous Vehicle Fleet

Figure 2:
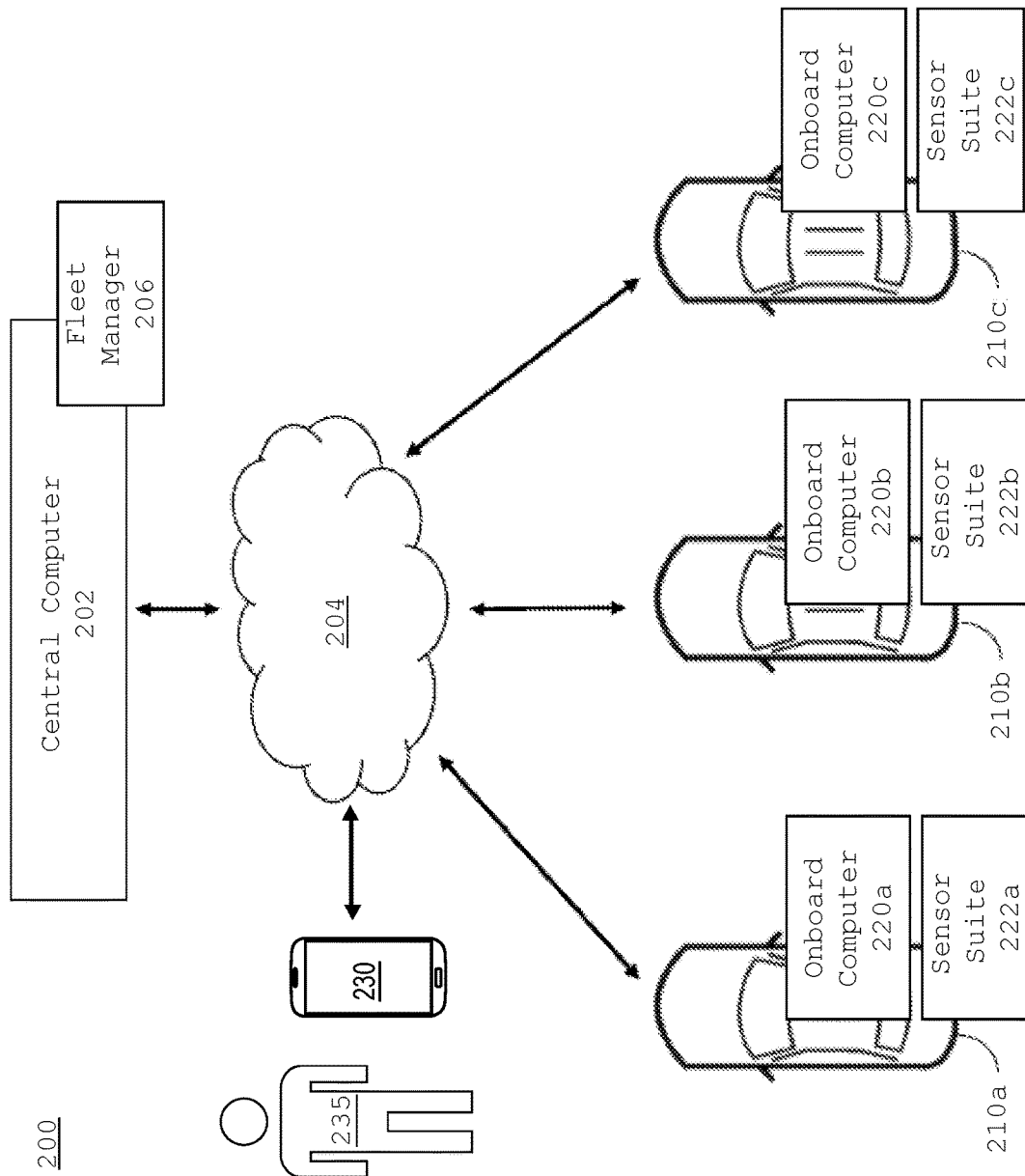
FIG. 2 is a diagram illustrating an example fleet of autonomous vehicles according to some embodiments of the present disclosure.

FIG. 2 is a diagram 200 illustrating a fleet of autonomous vehicles 210a, 210b, 210c in communication with a central computer 202 according to some embodiments of the disclosure. As shown in FIG. 2, the vehicles 210a-210c may communicate wirelessly with a central computer 202 and a cloud 204. The central computer 202 may include a fleet management system 206, which may include a routing coordinator and a database of information from the vehicles 210a-210c in the fleet. Each vehicle 210a-210c can include respective onboard computer 220a-220c and sensor suites 222a-222c, which can be similar to the onboard computer 104 and sensor suites 102 of FIG. 1.

The central computer 202 (and more particularly the fleet management system 206) may receive ride hail service requests for one of the autonomous vehicles 210 from user devices 230. Autonomous vehicle fleet routing refers to the routing of multiple vehicles in a fleet. In some implementations, autonomous vehicles communicate directly with each other. For example, a user 235 may make a request for ride hail service using a mobile app executing on the user device 230. The user device 230 may transmit the request directly to the fleet management system 206. The fleet management system 206 dispatches one of the autonomous vehicles 210a-210c to carry out the service request. When the dispatched one of the autonomous vehicles 210a-210c arrives at the pick-up location (i.e., the location at which the user is to meet the autonomous vehicle to begin the ride hail service), the user may be notified by the mobile app to meet the autonomous vehicle.

When a ride request is received from a passenger, the routing coordinator may select an autonomous vehicle 210a-210c to fulfill the ride request and generates a route for the autonomous vehicle 210a-210c. As described herein, in some examples, the routing coordinator selects more than one autonomous vehicle 210a-210c to fulfill the ride request. The generated route includes a route from the autonomous vehicle's present location to the pick-up location, and a route from the pick-up location to the final destination. In some examples, the generated route includes a route from the pick-up location to a selected waypoint, and a route from the selected waypoint to the final destination. In some examples, a first autonomous vehicle 210a drives the route to the waypoint and a second autonomous vehicle 210b drives the route from the waypoint to the final destination. In various examples, the route includes multiple waypoints and multiple autonomous vehicles. In some implementations, the central computer 202 communicates with a second fleet of autonomous vehicles, and a vehicle from the second fleet of autonomous vehicles drives the route from the waypoint to the final destination.

Each vehicle 210a-210c in the fleet of vehicles may communicate with a routing coordinator. Information gathered by various autonomous vehicles 210a-210c in the fleet can be saved and used to generate information for future routing determinations. For example, sensory data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest time route for each autonomous vehicle. In some implementations, the routing coordinator uses collected position data to generate a best route for an autonomous vehicle in view of one or more traveling preferences and/or routing goals.

The routing coordinator uses map data to select an autonomous vehicle from the fleet to fulfill a ride request. In some implementations, the routing coordinator sends the selected autonomous vehicle the ride request details, including pick-up location and destination location, and an onboard computer (e.g., onboard computer 220a, 220b, or 220c) on the selected autonomous vehicle generates a route and navigates to the destination. In some examples, the routing coordinator also sends the selected vehicle one or more stops, including a charging station stop, for the autonomous vehicle to recharge. In some examples, the routing coordinator sends a first vehicle the pick-up location and a waypoint location, and the routing coordinator sends a second vehicle the waypoint location and the destination location, such that the passenger switches vehicles mid-ride. In some implementations, the routing coordinator in the central computer 202 generates a route for each selected autonomous vehicle 210a-210c, and the routing coordinator determines a route for the autonomous vehicle 210a-210c to travel from the autonomous vehicle's current location to a first stop.

Central computer 202 may include a model trainer for training classification models used to classify objects by applying machine learning techniques to training data. Classification models may be downloaded to onboard computers 220*a*, 220*b*, 220*c*, for use in classifying objects encountered by the autonomous vehicle 210*a*, 210*b*, 210*c*.

Example Onboard Computer

Figure 3:
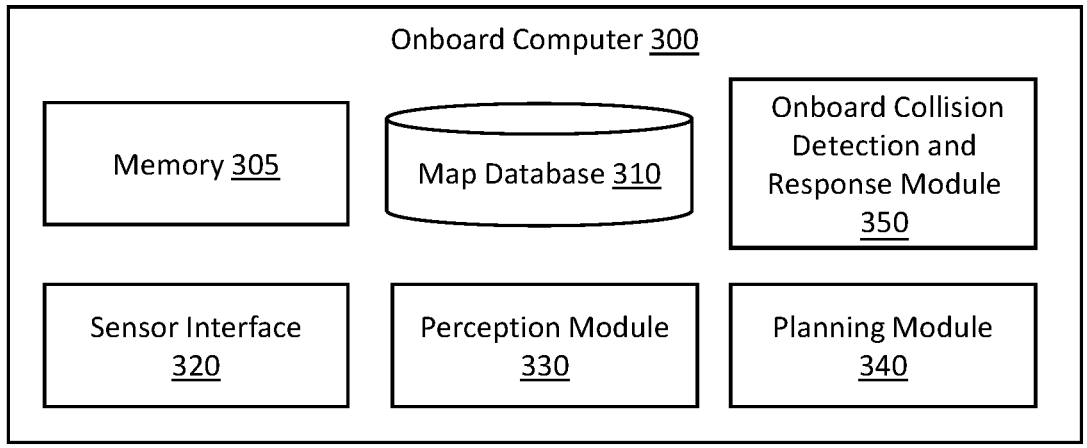
FIG. 3 is a diagram illustrating an onboard computer according to some embodiments of the present disclosure.

FIG. 3 is a block diagram illustrating an onboard computer 300, which may be used to implement onboard computer 104 (FIG. 1) and onboard computers 220 (FIG. 2) for enabling features according to some embodiments of the present disclosure. The onboard computer 300 may include memory 305, a map database 310, a sensor interface 320, a perception module 330, a planning module 340, and onboard collision detection and response module 350. In alternative configurations, fewer, different and/or additional components may be included in the onboard computer 300. For example, components and modules for controlling movements of the vehicles 110, 210, and other vehicle functions, and components and modules for communicating with other systems, such as central computer 202 and/or cloud 204, are not shown in FIG. 3. Further, functionality attributed to one component of the onboard computer 300 may be accomplished by a different component included in the onboard computer 300 or a different system from those illustrated.

The map database 310 stores a detailed map that includes a current environment of the vehicle. The map database 310 includes data describing roadways (e.g., locations of roadways, connections between roadways, roadway names, speed limits, traffic flow regulations, toll information, etc.) and data describing buildings (e.g., locations of buildings, building geometry, building types). The map database 310 may further include data describing other features, such as bike lanes, sidewalks, crosswalks, traffic lights, parking lots, etc.

The sensor interface 320 interfaces with the sensors in the sensor suite of the vehicle (e.g., sensor suite 102 (FIG. 1)). The sensor interface 320 may request data from the sensor suite, e.g., by requesting that a sensor capture data in a particular direction or at a particular time. The sensor interface 320 is configured to receive data captured by sensors of the sensor suite. The sensor interface 320 may have subcomponents for interfacing with individual sensors or groups of sensors of the sensor suite, such as a thermal sensor interface, a camera interface, a LIDAR interface, a RADAR interface, a microphone interface, etc.

The perception module 330 identifies objects in the environment of the vehicle. The sensor suite produces a data set that is processed by the perception module 330 to detect other cars, pedestrians, trees, bicycles, and objects traveling on or near a road on which the vehicle is traveling or stopped, and indications surrounding the vehicle (such as construction signs, traffic cones, traffic lights, stop indicators, and other street signs). For example, the data set from the sensor suite may include images obtained by cameras, point clouds obtained by LIDAR sensors, and data collected by RADAR sensors. The perception module 330 may include one or more classifiers trained using machine learning to identify particular objects. For example, a multi-class classifier may be used to classify each object in the environment of the vehicle as one of a set of potential objects, e.g., a vehicle, a pedestrian, or a cyclist. As another example, a human classifier recognizes humans in the environment of the vehicle, a vehicle classifier recognizes vehicles in the environment of the vehicle, etc.

The planning module 340 plans maneuvers for the vehicle based on map data retrieved from the map database 310, data received from the perception module 330, and navigation information, e.g., a route instructed by the fleet management system. In some embodiments, the planning module 340 receives map data from the map database 310 describing known, relatively fixed features and objects in the environment of the vehicle. For example, the map data includes data describing roads as well as buildings, bus stations, trees, fences, sidewalks, etc. The planning module 340 receives data from the perception module 330 describing at least some of the features described by the map data in the environment of the vehicle. The planning module 340 determines a pathway for the vehicle to follow. The pathway includes locations for the vehicle to maneuver to, and timing and/or speed of the vehicle in maneuvering to the locations.

The onboard collision detection and response module 350 may interact with other modules of the onboard computer 300 and other modules and systems to control and provide various aspects of the functionality and features of embodiments described herein and particularly as described below with reference to FIG. 6. A vehicle that includes an onboard collision detection and response module, such as the onboard collision detection and response module, may be referred to herein as a "CVCAS-enabled vehicle" and is capable of implementing the features as described herein.

Example Fleet Management System

Figure 4:
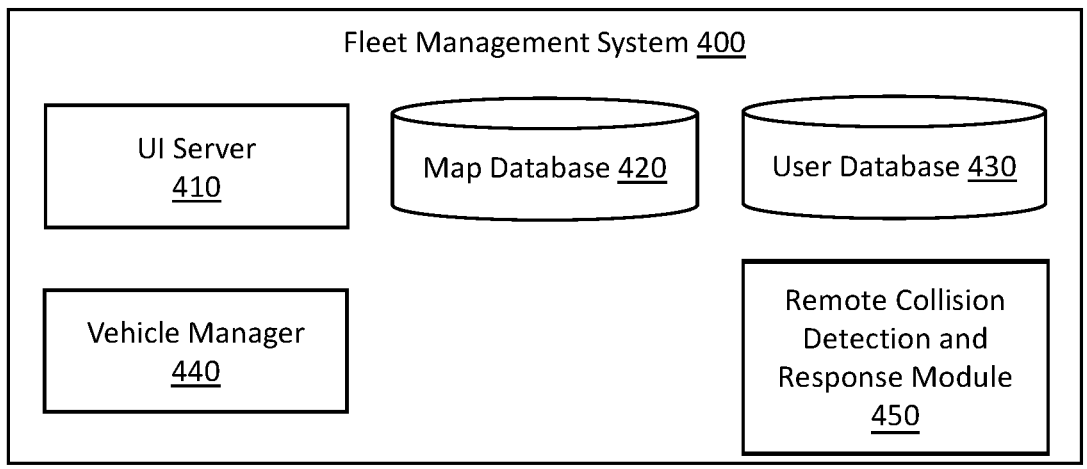
FIG. 4 is a diagram illustrating a fleet management system according to some embodiments of the present disclosure.

FIG. 4 is a block diagram illustrating a fleet management system 400, which may be implemented by central computer 202 (FIG. 2), according to some embodiments of the present disclosure. The fleet management system 400 includes a user interface (UI) server 410, a map database 420, a user database 430, a vehicle manager 440, and a remote collision detection and response module 450. In alternative configurations, different, additional, or fewer components may be included in the fleet management system 400. Further, functionality attributed to one component of the fleet management system 400 may be accomplished by a different component included in the fleet management system 400 or a different system than those illustrated.

The fleet management system 400 manages a fleet of autonomous vehicles, such as autonomous vehicle 110. The fleet management system 400 may manage one or more services that provide or use the autonomous vehicles, e.g., a service for providing rides to users with the autonomous vehicles, or a service that delivers items, such as prepared foods, groceries, or packages, using the autonomous vehicles. The fleet management system 400 may select an autonomous vehicle from the fleet of autonomous vehicles to perform a particular service or other task and instruct the selected autonomous vehicle to autonomously drive to a particular location (e.g., a designated pick-up location) to pick-up a user and/or drop off an order to a user. The fleet management system 400 may select a route for the autonomous vehicle to follow. The fleet management system 400 may also manage fleet maintenance tasks, such as charging, servicing, and cleaning of the autonomous vehicle. As illustrated in FIG. 2, the autonomous vehicles may communicate with the fleet management system 400. The autonomous vehicle and the fleet management system 400 may connect over a public network, such as the Internet.

The UI server 410 is configured to communicate with client devices that provide a user interface to users. For example, the UI server 410 may be a web server that provides a browser-based application to client devices, or the UI server 410 may be a user app server that interfaces with a user app installed on client devices. The UI enables the user to access a service of the fleet management system

400, e.g., to request a ride from an autonomous vehicle, or to request a delivery from an autonomous vehicle. For example, the UI server 410 receives a request for a ride that includes an origin location (e.g., the user's current location) and a destination location, or a request for a delivery that includes a pick-up location (e.g., a local restaurant) and a destination location (e.g., the user's home address).

The map database 420 stores a detailed map describing roads and other areas (e.g., parking lots, autonomous vehicle service facilities) traversed by a fleet of autonomous vehicles, such as vehicles 210 (FIG. 2). The map database 420 includes data describing roadways (e.g., locations of roadways, connections between roadways, roadway names, speed limits, traffic flow regulations, toll information, etc.), data describing buildings (e.g., locations of buildings, building geometry, building types), and data describing other objects (e.g., location, geometry, object type), and data describing other features, such as bike lanes, sidewalks, crosswalks, traffic lights, parking lots, etc. At least a portion of the data stored in the map database 420 is provided to onboard computers of vehicles in the fleet, such as onboard computer 300 (FIG. 3), as a map database 310 (FIG. 3), described above.

The user database 430 stores data describing users of the fleet of vehicles managed by fleet management system 400. Users may create accounts with the fleet management system 400, which stores user information associated with the user accounts, or user profiles, in the user database 430. The user information may include identifying information (name, username), password, payment information, home address, contact information (e.g., email and telephone number), and information for verifying the user (e.g., photograph, driver's license number). Users may provide some or all of the user information, including user preferences regarding certain aspects of services provided by the rideshare system, to the fleet management system 400. In some embodiments, the fleet management system 400 may infer some user information from usage data or obtain user information from other sources, such as public databases or licensed data sources.

The fleet management system 400 may learn one or more home addresses for a user based on various data sources and user interactions. The user may provide a home address when setting up his account, e.g., the user may input a home address, or the user may provide an address in conjunction with credit card information. In some cases, the user may have more than one home, or the user may not provide a home address, or the user-provided home address may not be correct (e.g., if the user moves and the home address is out of date, or if the user's address associated with the credit card information is not the user's home address). In such cases, the fleet management system 400 may obtain a home address from one or more alternate sources. In one example, the fleet management system 400 obtains an address associated with an official record related to a user, such as a record from a state licensing agency (e.g., an address on the user's driver's license), an address from the postal service, an address associated with a phone record, or other publicly available or licensed records. In another example, the fleet management system 400 infers a home address based on the user's use of a service provided by the fleet management system 400. For example, the fleet management system 400 identifies an address associated with at least a threshold number of previous rides provided to a user (e.g., at least 10 rides, at least 50% of rides, or a plurality of rides), or at least a threshold number of previous deliveries (e.g., at least five deliveries, at least 60% of deliveries) as a home address or candidate home address. The fleet management system 400 may look up a candidate home address in the map database 420 to determine if the candidate home address is associated with a residential building type, e.g., a single-family home, a condominium, or an apartment. The fleet management system 400 stores the identified home address in the user database 430. The fleet management system 400 may obtain or identify multiple addresses for a user and associate each address with the user in the user database 430. In some embodiments, the fleet management system 400 identifies a current home address from multiple candidate home addresses, e.g., the most recent address, or an address that the user rides to or from most frequently and flags the identified current home address in the user database 430.

The vehicle manager 440 directs the movements of the vehicles in the fleet managed by fleet management system 400 (e.g., vehicles 210 (FIG. 2)). The vehicle manager 440 receives service requests from users from the UI server 410, and the vehicle manager 440 assigns service requests to individual vehicles. For example, in response to a user request for transportation from an origin location to a destination location, the vehicle manager 440 selects a vehicle and instructs the vehicle to drive to the origin location (e.g., a passenger or delivery pick-up location), and then instructs the vehicle to drive to the destination location (e.g., the passenger or delivery destination location). In addition, the vehicle manager 440 may instruct vehicles to drive to other locations while not servicing a user, e.g., to improve geographic distribution of the fleet, to anticipate demand at particular locations, to drive to a charging station for charging, etc. The vehicle manager 440 also instructs vehicles to return to autonomous vehicle facilities for recharging, maintenance, or storage.

The remote collision detection and response module 450 may interact with other modules of the onboard computer 300 and the fleet management system 400 to manage and control various aspects of features and functionality of embodiments described herein and particularly as described below with reference to FIG. 6. In particular, the remote collision detection and response module 450 supports CVCAS features as described herein.

Example Witness Vehicle Network

Figure 5A:
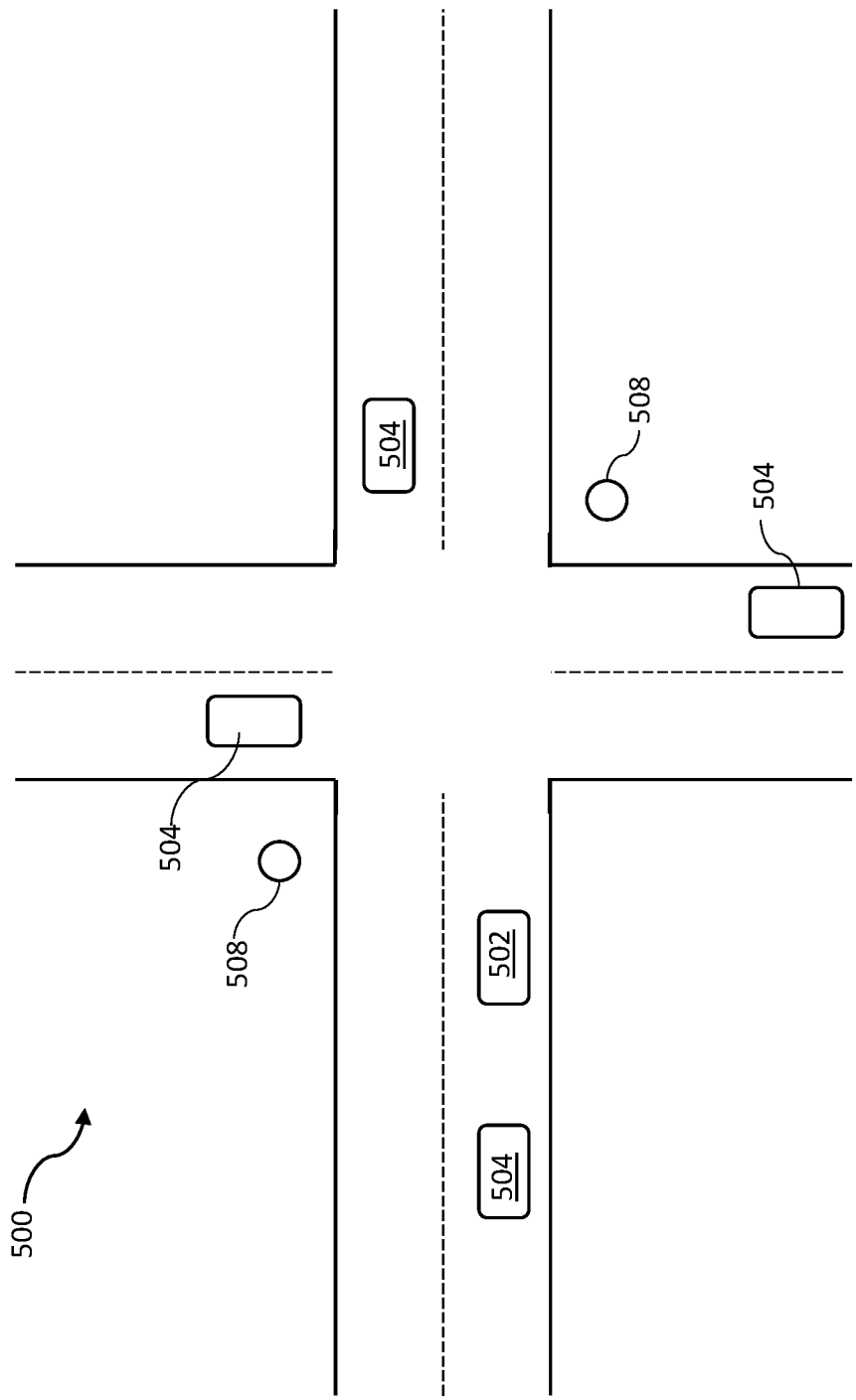
FIGS. 5A and 5B are diagrams illustrating a witness vehicle network of a coordinated vehicle collision avoidance system according to some embodiments of the present disclosure.

FIG. 5A is a block diagram illustrating a network 500 of a witness vehicle 502, which in the illustrated embodiment is a CVCAS-enabled autonomous vehicle. In accordance with features of embodiments described herein, the witness vehicle 502 may receive sensory data and other information from other CVCAS-enabled vehicles 504 in the network 500. The sensory data received by the witness vehicle 502 from the vehicles 504 may include the same type(s) of sensory data as received from the onboard sensors of the witness vehicle 502. In accordance with features of embodiments described herein, vehicles 504 may include one or more of other autonomous vehicles in the same fleet as the witness vehicle 502 (i.e., autonomous vehicles operated by the same autonomous vehicle company), autonomous vehicles in other fleets (i.e., autonomous vehicles operated by different autonomous vehicle companies) equipped with compatible hardware and software, and vehicles operated by humans equipped with the hardware and software necessary to participate in the network 500. In certain embodiments, the network 500 is confined to a limited geographic area (e.g., a within a certain distance from the witness vehicle 502). In some embodiments, stationary constructs (e.g., utility poles, traffic lights, street signs, etc.) 508 provided with the necessary sensory and compute capabilities may participate in the network 500 and provide sensory data and other information to the witness autonomous vehicle 502 as well as the vehicles 504.

In accordance with features of embodiments described herein, the witness vehicle 502 may communicate with one or more of the vehicles 504 and/or stationary constructs 508 in the network 500 using wireless communication protocols, such as Bluetooth, WiFi, and radio frequency (RF), for example. The commonality of the network 500 may be established through use of a standardized messages, or CIPBP messages, which may contain information regarding the location of the vehicle, sensory data (e.g., kinetic information measured by inertial sensing units, locations and footprints of perceived objects using cameras or LIDARs, etc.), planned trajectory and kinematics of the vehicle, and raw sensory data (e.g., raw images or point clouds, etc.), etc. In addition, the CIPBP messages may contain information regarding the availability of an automated collision avoidance capability of the vehicle and may provide interfaces for interacting with such collision avoidance capability.

Figure 5B:
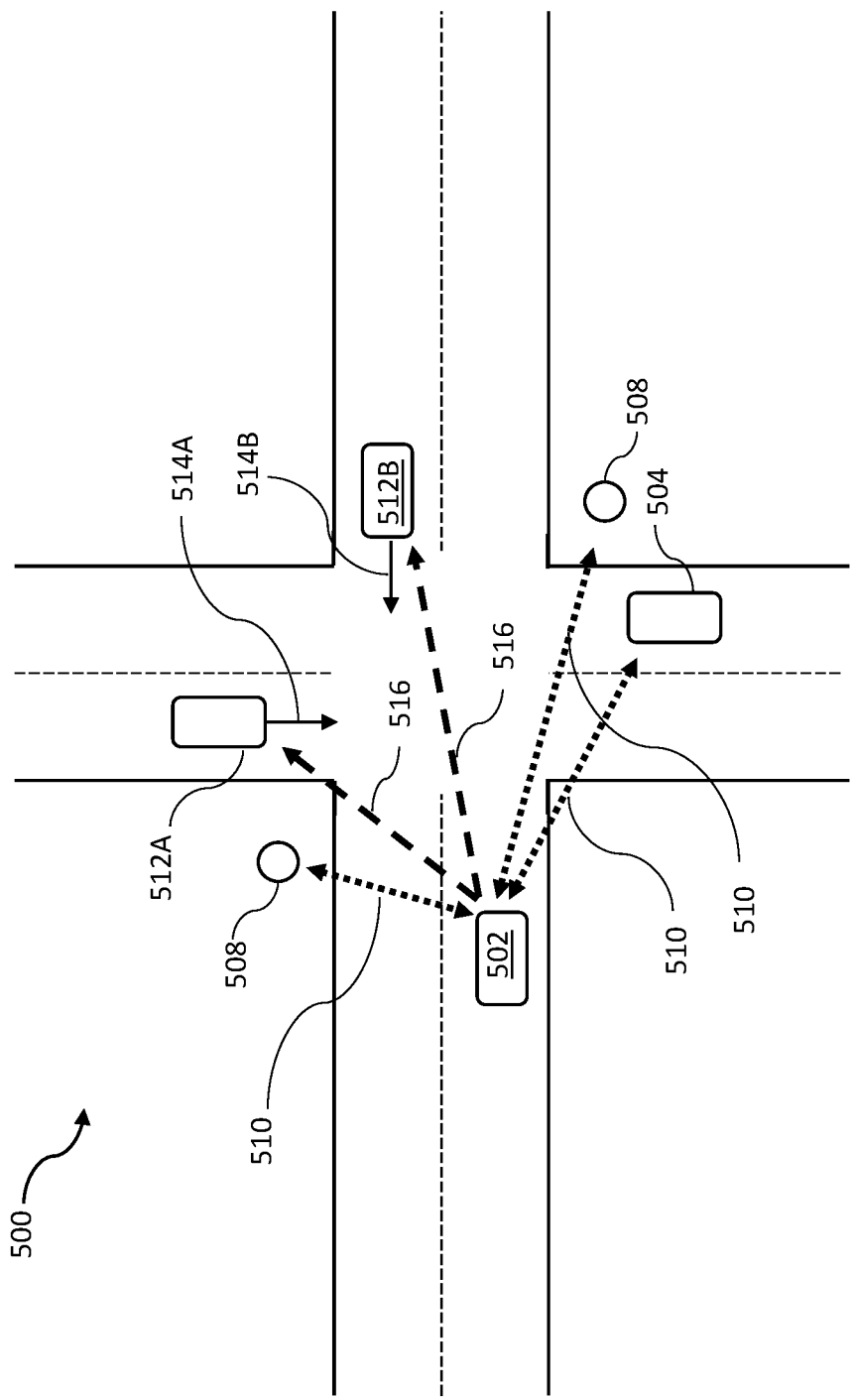

Referring now to FIG. 5B, in the illustrated scenario, witness vehicle 502 may communicate with vehicle 504 and constructs 508, exchanging CIPBP messages 510 via the network 500. At some point, the witness vehicle 502 may determine, using its own sensory data and other information, as well as sensory data and other information received as CIPBP messages 510 from one or more of vehicle 504 and constructs 508, that a collision between a participant vehicle 512A (which is proceeding in a direction indicated by an arrow 514A) and a participant vehicle 512B (which is proceeding in a direction indicated by an arrow 514B) is imminent. As will be described in greater detail below with reference to FIG. 6, upon determining that such a collision is imminent, witness vehicle 502 may broadcast one or more alerts 516 designed to prompt vehicles 512A, 512B to take appropriate action to prevent the collision from occurring or to mitigate the effects of the collision. As will be described in greater detail below, alerts 516 may be auditory or visual alerts and/or may be targeted toward one or more of participant vehicles 512 individually or broadcast to the vehicles 512 (as well as other vehicles) as a group.

Example Methods for CVCAS Feature Implementation and Operation

Figure 6:
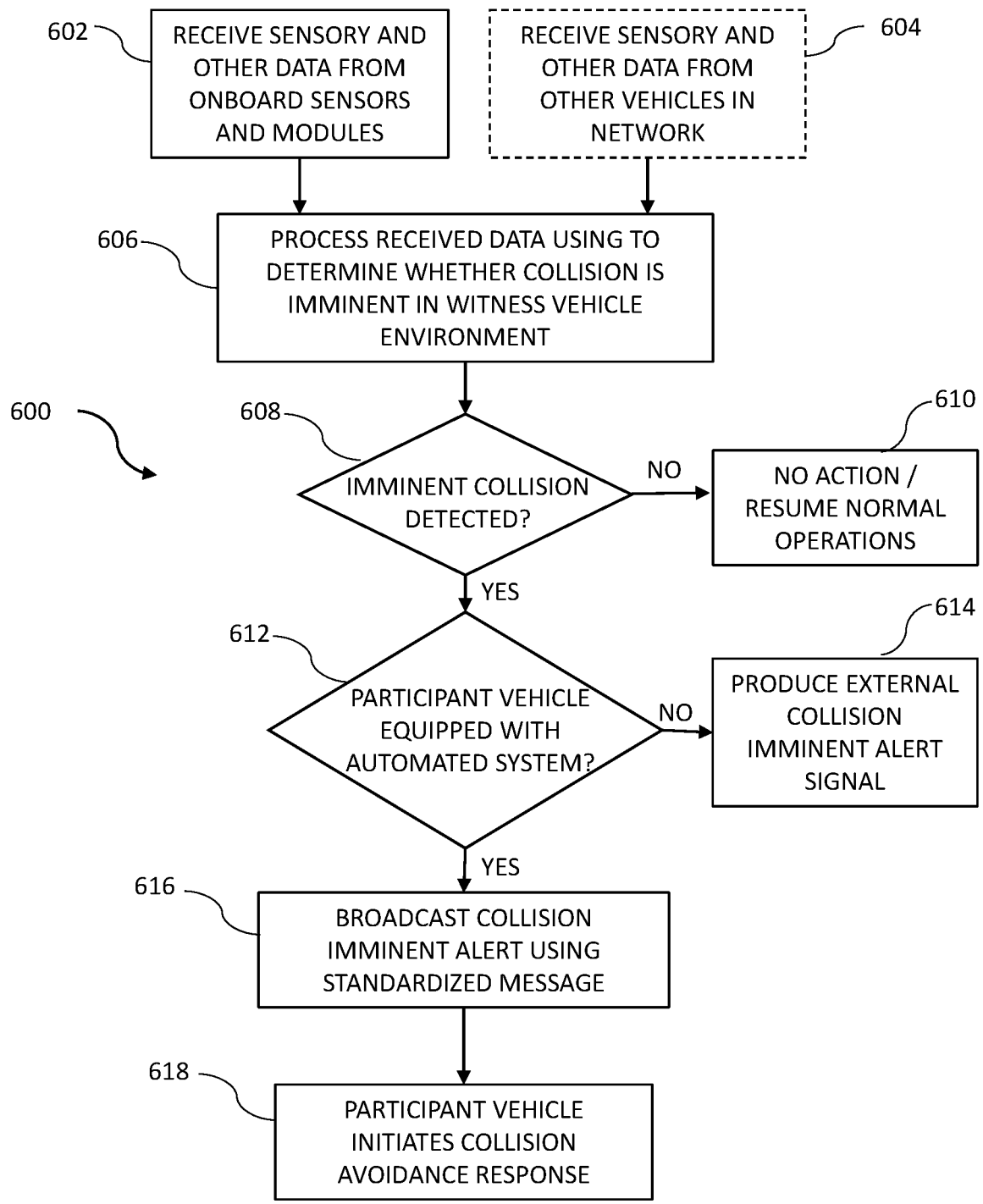
FIG. 6 is a flowchart illustrating example processes for implementing a coordinated vehicle collision avoidance system according to some embodiments of the present disclosure.

FIG. 6 is a flowchart illustrating example processes for implementing a CVCAS system according to some embodiments of the present disclosure. It will be recognized that one or more of the steps illustrated in FIG. 6 may be executed by one or more of the elements shown in FIGS. 3 and/or 4.

FIG. 6 is a flowchart 600 illustrating an example method of implementing a CVCAS system using a witness vehicle (e.g., a witness autonomous vehicle) in a network in accordance with features described herein.

In step 602, sensory data and other information (e.g., perception and planning/predictive information) may be received from onboard sensors and other modules and/or equipment of the witness vehicle. Additionally, in some embodiments, information may be received from a fleet management system, such as fleet management system 400 (FIG. 4).

In optional step 604, sensory data and other standardized message information may be received from other CVCAS-enabled vehicles in the same network and geographic area as the witness vehicle (referred to herein as "secondary witnesses") via CIPBP messages. The sensory data may include the same type of sensory data as received from the onboard sensors of the witness vehicle. The standardized message information may include any or all of the information described above in connection with FIG. 5A. In accordance with features of embodiments described herein, secondary witnesses may include other autonomous vehicles in the same fleet as the witness vehicle (i.e., autonomous vehicles operated by the same company as the witness vehicle), autonomous vehicles in other fleets (i.e., autonomous vehicles operated by different companies than the witness vehicle) equipped with compatible hardware and software, or vehicles operated by humans equipped with the hardware and software necessary to participate in the witness vehicle's network (i.e., by exchanging standardized CIPBP messages over the network). In certain embodiments, the secondary witnesses are located within a predetermined distance from the witness vehicle. In some embodiments, stationary constructs (e.g., utility poles, traffic lights, traffic signs, etc.) provided with the necessary sensory and compute capabilities may participate in the witness vehicle's network and may be able to function as a secondary witnesses by exchanging standardized CIPBP messages with the witness vehicle.

In step 606, the witness vehicle may process the available sensory data and other information (received from onboard sensors and modules, as well as optionally from other vehicles in the network via CIPBP messages) to determine whether a collision involving one or more other vehicles in the area is imminent. In some embodiments, the witness vehicle can explicitly make use of the exchanged standardized CIPBP message information from secondary witnesses to detect/predict imminent collisions involving one or more other vehicles. In other embodiments, the witness vehicle may rely solely on its own sensory and other capabilities to detect/predict imminent collisions involving one or more other vehicles. In certain embodiments, a witness vehicle may determine that a collision is imminent in its environment by combining sensory data and outputs from its internal perception and planning systems, as well as any additional information provided by other CVCAS-enabled vehicles within the same network as the witness vehicle. The CVCAS-enabled vehicles within the witness vehicle's network may include other autonomous vehicles.

In step 608, a determination is made whether an imminent collision involving one or more other vehicles in the vicinity of the witness vehicle has been detected/predicted. If not, execution proceeds to step 610; otherwise, execution proceeds to step 612.

In step 610, normal operations are resumed and no action is taken, as there is no imminent collision to be addressed.

In step 612, once an imminent collision involving one or more other (participant) vehicles has been detected/predicted, a determination is made for each of the participant vehicles whether the participant vehicle is a participant in the witness vehicle's network and therefore capable of exchanging standardized CIPBP messages with the witness vehicle. If the participant vehicle is not a participant in the witness vehicle's network, execution proceeds to step 614; otherwise, execution proceeds to step 616.

In step 614, once it is determined that the participant vehicle is not a participant in the witness vehicle's network, the witness vehicle may alert active traffic participants in the vicinity of the imminent collision (including the participant vehicle) by producing an external alert signal. This external alert signal may include auditory elements (e.g., honking the horn of the witness vehicle or playing a recorded message over an external speaker of the witness vehicle) and/or visual elements (e.g., flashing the headlights of the witness vehicle, projecting a warning message on the street or other surface where it is likely to be seen by a human driver of the participant vehicle, or displaying a warning message on a window of the witness vehicle). The purpose of the external alert signal is to alert actors in the area of the imminent collision and to prompt them to take action to avoid and/or mitigate the effects of the collision.

In step 616, once it is determined that the participant vehicle is in the witness vehicle's network, the witness vehicle may alert the participant vehicle regarding the imminent collision. In some embodiments, the alert may include broadcasting information about the imminent collision on the network using the standardized CIPBP message format. As previously noted, the contents of the standardized CIPBP message may include one or more of the location and severity of the predicted collision, footprints and/or other identifying information regarding the participant vehicles (and/or other objects involved in the predicted collision), time to predicted collision, and a timestamp of the sensory data used to detect/predict the collision.

In some embodiments, the witness vehicle may incorporate information provided by secondary witnesses in its network and/or information from a fleet management system, such as fleet management system 400 (FIG. 4), to predict the best course of action for the participant vehicle to avoid the collision. This best course of proposed action may be communicated to the participant vehicle as a part of the standardized CIPBP message broadcast on the network so that it may be readily implemented by the participant vehicle. This course of action may be defined broadly (e.g., brake as hard as possible, swerve to the right) or may be prescribed in terms of optimal trajectories (sequences of vehicle kinematics and position information). It will be recognized that different information and/or instructions may be provided to different ones of the participating vehicles as necessary to avoid the detected/predicted imminent collision. For example, a first one of the participant vehicles may be instructed to swerve to the left while a second one of the participant vehicles may be instructed to brake quickly.

In some embodiments, the alert issued to the participant vehicle may be a control signal to an ADS or DAS system of the participant vehicle to cause the participant vehicle to take a particular action (e.g., apply the brakes or turn left or right). In some embodiments, the alert issued to the participant vehicle may be a text message displayed on the dashboard of the participant vehicle and/or an audio message played over the speakers in the cabin of the participant vehicle. In any of the foregoing embodiments, the purpose of the alert issued is to prevent the imminent collision from occurring. In some embodiments, the alert may be issued by the witness vehicle or by a remote system based on sensory data from the witness vehicle.

In step 618, the participant vehicle may initiate an appropriate collision avoidance response based on the information included in the standardized CIPBP message broadcast by the witness vehicle as well as any other sensory data and/or information available to the participant vehicle.

In some embodiments, each participant vehicle can make decisions individually to determine the best course of action given an imminent collision is imminent. In yet other embodiments the participant vehicles can coordinate the collision imminent response without input from the witness vehicle using the standardized CIPBP message format to exchange information with each other via the network.

In some embodiments, one or more of the participant vehicles may be replaced by a participant entity, which participant entity may be a human or non-human entity. For example, in some embodiments, the participant entity may be a pedestrian or cyclist equipped with a wearable device, such as a watch, capable of participating in the network of the witness vehicle and therefore capable of receiving alerts such as described hereinabove.

It will be recognized that both steps 614 and 616 may be implemented, for example, in a case in which the participant vehicles include at least one "in-network" vehicle and at least one "out-of-network," vehicle.

In some embodiments, information from a remote system, such as a fleet management system, may be utilized by the witness vehicle to detect/predict an imminent collision. In certain embodiments, a remote system, such as a fleet management system, may participate in coordination and/or execution of the operations of the example method shown in FIG. 6.

Although the operations of the example method shown in FIG. 6 are illustrated as occurring once each and in a particular order, it will be recognized that the operations may be performed in any suitable order and repeated as desired. Additionally, one or more operations may be performed in parallel. Furthermore, the operations illustrated in FIG. 6 may be combined or may include more or fewer details than described. Still further, one or more operations may be omitted.

SELECT EXAMPLES

Example 1 provides a method comprising using sensory data produced by at least one onboard sensor of a witness vehicle to predict an imminent collision in an environment of the witness vehicle, the predicted imminent collision involving at least one participant vehicle; and alerting the least one participant vehicle to the predicted imminent collision, wherein the alerting is performed by the witness vehicle and prompts the at least one participant vehicle to perform at least one action to mitigate the predicted imminent collision.

Example 2 provides the method of example 1, further comprising using perception information of the witness vehicle in combination with the sensory data to predict the imminent collision.

Example 3 provides the method of any of examples 1-2, wherein the witness vehicle is a participant in a communications network, the method further comprising using sensory data produced by at least one secondary witness in the environment of the witness vehicle to predict the imminent collision.

Example 4 provides the method of example 3, wherein the at least one secondary witness is also a participant in the communications network and communicates with the witness vehicle via a standardized message protocol.

Example 5 provides the method of example 3, wherein the at least one secondary witness comprises at least one of a second vehicle and a stationary construct.

Example 6 provides the method of example 5, wherein the second vehicle comprises an autonomous vehicle.

Example 7 provides the method of any of examples 1-6, wherein the witness vehicle is a participant in a communications network, the method further comprising determining whether the at least one participant vehicle is a participant in the communications network.

Example 8 provides the method of example 7, wherein if the participant vehicle is a participant in the communications network, the alerting is performed using the communications network.

Example 9 provides the method of example 8, wherein the alerting comprises at least one of causing a message to be broadcast on a speaker provided inside the participant vehicle, causing a message to be displayed on a display provided inside the participant vehicle, and causing an action to be taken by an automated driving system of the participant vehicle.

Example 10 provides the method of example 7, wherein if the participant vehicle is a not participant in the communications network, the alerting is performed using an external collision imminent signal.

Example 11 provides the method of example 10, wherein the external collision imminent signal comprises at least one of an auditory element produced by the witness vehicle and a visual element produced by the witness vehicle.

Example 12 provides the method of example 11, wherein the auditory element includes at least one of honking the horn of the witness vehicle and playing a recorded message over an external speaker of the witness vehicle.

Example 13 provides the method of example 11, wherein the visual element includes at least one of flashing headlights of the witness vehicle, projecting a warning message on a surface proximate the participant vehicle, and displaying a message on a window of the witness vehicle.

Example 14 provides the method of any of examples 1-13, wherein the at least one action comprises at least one of turning the participant vehicle and braking the participant vehicle.

Example 15 provides a method comprising collecting sensory data produced by an onboard sensor of an autonomous vehicle (AV) and sensory data produced by an onboard sensor of a secondary witness entity; processing the collected sensory data to predict an imminent collision in an environment of the AV, the predicted imminent collision involving at least one participant entity; and providing an alert to the least one participant entity, wherein the alert is provided by the AV and prompts the at least one participant entity to perform at least one mitigating action with regard to the predicted imminent collision; wherein the AV and the secondary witness communicate with one another via a communications network using a standardized messaging protocol.

Example 16 provides the method of example 15, further comprising collecting supplemental data of the AV and the secondary witness entity and processing the collected supplemental data in combination with the collected sensory information to predict the imminent collision.

Example 17 provides the method of example 16, wherein the secondary witness entity comprises at least one of a second vehicle and a stationary construct.

Example 18 provides the method of example 17 wherein the second vehicle comprises a second AV.

Example 19 provides the method of any of examples 15-18, further comprising determining whether the at least one participant entity is a participant in the communications network.

Example 20 provides the method of example 19, wherein if the participant entity is a participant in the communications network, the providing the alert is performed using the communications network.

Example 21 provides the method of example 20, wherein the alert comprises at least one of a message broadcast on a speaker of the participant entity, a message displayed on a display of the participant entity, and a control signal provided to an automated driving system of the participant entity.

Example 22 provides the method of example 21, wherein if the participant entity is a not participant in the communications network, the alert is provided using an external collision imminent signal.

Example 23 provides the method of example 22, wherein the external collision imminent signal comprises at least one of an auditory element produced by the AV and a visual element produced by the AV.

Example 24 provides the method of example 23, wherein the auditory element includes at least one of honking the horn of the AV and playing a recorded message over an external speaker of the AV.

Example 25 provides the method of example 23, wherein the visual element includes at least one of flashing headlights of the AV, projecting a warning message on a surface proximate the participant entity, and displaying a message on a window of the AV.

Example 26 provides the method of any of examples 15-25, wherein the participant entity is a second AV and the at least one action comprises at least one of changing a direction of the second AV and applying the brakes on the second AV.

Example 27 provides a vehicle collision detection and response (VCDR) system, the VCDR system comprising a witness vehicle including a sensor suite and a perception module, wherein witness vehicle uses data produced by the sensor suite and the perception module to predict an imminent collision in an environment of the witness vehicle, the predicted imminent collision involving at least one participant vehicle; and wherein the witness vehicle alerts the least one participant vehicle to the predicted imminent collision to prompt the at least one participant vehicle to perform at least one action to mitigate the predicted imminent collision.

Example 28 provides the VCDR system of example 27, wherein the witness vehicle is a participant in a communications network, wherein sensory data produced by at least one secondary witness comprising a participant in the communications network is used by the witness vehicle to predict the imminent collision.

Example 29 provides the VCDR system of example 28, wherein the at least one secondary witness communicates with the witness vehicle via the network using a standardized message protocol.

Example 30 provides the VCDR system of example 28, wherein the at least one secondary witness comprises at least one of an autonomous vehicle and a stationary construct.

Example 31 provides the VCDR system of any of examples 27-30, wherein the witness vehicle is a participant in a communications network and wherein if the participant vehicle is a participant in the communications network, the alerting is performed using the communications network.

Example 32 provides the VCDR system of example 31, wherein the alerting comprises at least one of causing a message to be broadcast on a speaker provided inside the participant vehicle, causing a message to be displayed on a display provided inside the participant vehicle, and causing an action to be taken by an automated driving system of the participant vehicle.

Example 33 provides the VCDR system of any of examples 27-32, wherein the witness vehicle is a participant in the communications network and wherein if the participant vehicle is a not participant in the communications network, the alerting is performed using an external collision imminent signal.

Example 34 provides the VCDR system of example 33, wherein the external collision imminent signal comprises at least one of an auditory element produced by the witness vehicle and a visual element produced by the witness vehicle.

Example 35 provides the VCDR system of example 34, wherein the auditory element includes at least one of honking the horn of the witness vehicle and playing a recorded message over an external speaker of the witness vehicle.

Example 36 provides the VCDR system of example 34, wherein the visual element includes at least one of flashing headlights of the witness vehicle, projecting a warning message on a surface proximate the participant vehicle, and displaying a message on a window of the witness vehicle.

Example 37 provides the VCDR system of any of examples 27-36, wherein the at least one action comprises at least one of turning the participant vehicle and braking the participant vehicle.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the interior electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as exterior storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended examples. The specifications apply only to one non-limiting example and, accordingly, they should be construed as such. In the foregoing description, example embodiments have been described with reference to particular arrangements of components. Various modifications and changes may be made to such embodiments without departing from the scope of the appended examples. The description and drawings are, accordingly, to be regarded in an illustrative rather than in a restrictive sense.

Note that with the numerous examples provided herein, interaction may be described in terms of two, three, four, or more components; however, this has been done for purposes of clarity and example only. It should be appreciated that the system can be consolidated in any suitable manner. Along similar design alternatives, any of the illustrated components, modules, and elements of the figures may be combined in various possible configurations, all of which are clearly within the broad scope of this Specification.

Various operations may be described as multiple discrete actions or operations in turn in a manner that is most helpful in understanding the example subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended examples. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the examples appended hereto, Applicant wishes to note that the Applicant: (a) does not intend any of the appended examples to invoke paragraph (f) of 35 U.S.C. Section 112 as it exists on the date of the filing hereof unless the words "means for" or "step for" are specifically used in the particular examples; and (b) does not intend, by any statement in the Specification, to limit this disclosure in any way that is not otherwise reflected in the appended examples.

What is claimed is:

1. A method comprising:
    collecting sensory data produced by an onboard sensor of an autonomous vehicle (AV) and sensory data produced by an onboard sensor of a secondary witness entity;
    processing the collected sensory data to predict an imminent collision in an environment of the AV, the predicted imminent collision involving at least one participant entity;
    providing an alert to the least one participant entity, wherein the alert is provided by the AV and prompts the at least one participant entity to perform at least one mitigating action with regard to the predicted imminent collision, and wherein the AV and the secondary witness communicate with one another via a communications network using a standardized messaging protocol;
determining whether the at least one participant entity is a participant in the communications network if the participant entity is a participant in the communications network, providing the alert using the communications network; and
if the participant entity is a not participant in the communications network, providing the alert using an external collision imminent signal.

2. The method of claim 1, further comprising collecting supplemental data of the AV and the secondary witness entity and processing the collected supplemental data in combination with the collected sensory information to predict the imminent collision, wherein the secondary witness entity comprises at least one of a second vehicle and a stationary construct.

3. The method of claim 1, wherein the alert comprises at least one of a message broadcast on a speaker of the participant entity, a message displayed on a display of the participant entity, and a control signal provided to an automated driving system of the participant entity and wherein the external collision imminent signal comprises at least one of an auditory element produced by the AV and a visual element produced by the AV.

4. The method of claim 3, wherein the auditory element includes at least one of honking the horn of the AV and playing a recorded message over an external speaker of the AV and the visual element includes at least one of flashing headlights of the AV, projecting a warning message on a surface proximate the participant entity, and displaying a message on a window of the AV.

5. A method comprising:
using sensory data produced by at least one onboard sensor of a witness vehicle to predict an imminent collision in an environment of the witness vehicle, wherein the witness vehicle is a participant in a communications network and the predicted imminent collision involving at least one participant vehicle;
alerting the least one participant vehicle to the predicted imminent collision, wherein the alerting is performed by the witness vehicle and prompts the at least one participant vehicle to perform at least one action to mitigate the predicted imminent collision; and
determining whether the at least one participant vehicle is a participant in the communications network,
wherein if the participant vehicle is a participant in the communications network, the alerting is performed using the communications network, and
wherein if the participant vehicle is not a participant in the communications network, the alerting is performed using an external collision imminent signal.

6. The method of claim 5, further comprising using perception information of the witness vehicle in combination with the sensory data to predict the imminent collision.

7. The method of claim 5, further comprising:
using sensory data produced by at least one secondary witness in the environment of the witness vehicle to predict the imminent collision.

8. The method of claim 7, wherein the at least one secondary witness is also a participant in the communications network and communicates with the witness vehicle via a standardized message protocol.

9. The method of claim 7, wherein the at least one secondary witness comprises at least one of a second vehicle and a stationary construct.

10. The method of claim 9, wherein the second vehicle comprises an autonomous vehicle.

11. The method of claim 5, wherein the alerting comprises at least one of causing a message to be broadcast on a speaker provided inside the participant vehicle, causing a message to be displayed on a display provided inside the participant vehicle, and causing an action to be taken by an automated driving system of the participant vehicle.

12. The method of claim 5, wherein the external collision imminent signal comprises at least one of an auditory element produced by the witness vehicle and a visual element produced by the witness vehicle.

13. The method of claim 12, wherein the auditory element includes at least one of honking the horn of the witness vehicle and playing a recorded message over an external speaker of the witness vehicle and wherein the visual element includes at least one of flashing headlights of the witness vehicle, projecting a warning message on a surface proximate the participant vehicle, and displaying a message on a window of the witness vehicle.

14. The method of claim 5, wherein the at least one action comprises at least one of turning the participant vehicle and braking the participant vehicle.

15. A vehicle collision detection and response (VCDR) system, the VCDR system comprising:
a witness vehicle including a sensor suite and a perception module, wherein witness vehicle uses data produced by the sensor suite and the perception module to predict an imminent collision in an environment of the witness vehicle, the predicted imminent collision involving at least one participant vehicle;
wherein the witness vehicle alerts the least one participant vehicle to the predicted imminent collision to prompt the at least one participant vehicle to perform at least one action to mitigate the predicted imminent collision;
wherein the witness vehicle is a participant in a communications network, wherein sensory data produced by at least one secondary witness comprising a participant in the communications network is used by the witness vehicle to predict the imminent collision;
wherein the at least one secondary witness comprises at least one of an autonomous vehicle and a stationary construct; and
wherein if the participant vehicle is a participant in the communications network, the alerting is performed using the communications network and comprises at least one of causing a message to be broadcast on a speaker provided inside the participant vehicle, causing a message to be displayed on a display provided inside the participant vehicle, and causing an action to be taken by an automated driving system of the participant vehicle; and wherein if the participant vehicle is a not participant in the communications network, the alerting is performed using an external collision imminent signal comprising at least one of an auditory element produced by the witness vehicle and a visual element produced by the witness vehicle.

16. The VCDR system of claim 15, wherein the auditory element includes at least one of honking the horn of the witness vehicle and playing a recorded message over an external speaker of the witness vehicle and wherein the visual element includes at least one of flashing headlights of the witness vehicle, projecting a warning message on a surface proximate the participant vehicle, and displaying a message on a window of the witness vehicle.

17. The VCDR system of claim 15, wherein the at least one action comprises at least one of turning the participant vehicle and braking the participant vehicle.

* * * * *